United States Patent [19]

Derleth et al.

[11] 4,248,847

[45] Feb. 3, 1981

[54] PROCESS FOR PREPARING A SUBSTANTIALLY CRYSTALLINE SODIUM ALUMINOSILICATE

[75] Inventors: Helmut Derleth, Nienburg; Ludwig Walter, Hanover; Karl-Heinrich Bretz; Artur Kurs, both of Nienburg, all of Fed. Rep. of Germany

[73] Assignee: Kali-Chemie AG, Hanover, Fed. Rep. of Germany

[21] Appl. No.: 876,050

[22] Filed: Feb. 8, 1978

[30] Foreign Application Priority Data

Feb. 8, 1977 [DE] Fed. Rep. of Germany ....... 2705088

[51] Int. Cl.³ .......................................... C01B 33/28
[52] U.S. Cl. ................................... 423/329; 252/135; 423/328
[58] Field of Search .............................. 423/328–330; 252/455 Z, 89 R, 131, 135

[56] References Cited

U.S. PATENT DOCUMENTS

| | | | |
|---|---|---|---|
| 2,882,243 | 4/1959 | Milton | 423/328 |
| 2,904,607 | 9/1959 | Mattox et al. | 423/328 X |
| 3,058,805 | 10/1962 | Weber | 423/328 |
| 3,071,434 | 1/1963 | Frilette et al. | 423/329 |
| 3,985,669 | 10/1976 | Krummel et al. | 252/89 R X |
| 4,041,135 | 9/1977 | Williams et al. | 423/329 |
| 4,071,377 | 1/1978 | Schwuger et al. | 423/329 X |
| 4,072,622 | 2/1978 | Kuhling et al. | 423/328 |

*Primary Examiner*—Edward J. Meros
*Attorney, Agent, or Firm*—Schwartz, Jeffery, Schwaab, Mack, Blumenthal & Koch

[57] ABSTRACT

A process for preparing a synthetic substantially crystalline sodium aluminosilicate of the zeolite A type is disclosed. The process comprises rapidly and simultaneously introducing a sodium silicate and a sodium aluminate solution under thorough agitation at a constant by volume ratio which provides for a reaction mixture the content of which is equivalent to a molar ratio of x' $Na_2O$/ 1 $Al_2O_3$/ y $SiO_2$/z' $H_2O$ wherein x' is from about 6.5 to about 9.0, y is from about 1.7 to about 2.2 and z' is from about 180 to about 250, maintaining the reaction mixture at a temperature of from about 70° to about 100° C. under stirring for a sufficient period of time, usually 1–3 hours, in order to allow the initially amorphous reaction product to crystallize and recovering the substantially crystalline product from the resulting suspension. The essential feature of the process is a continuously maintained constant molar ratio $Na_2O$/ $Al_2O$/ $SiO_2$/$H_2O$ throughout the reaction mixture during the entire course of the process. The resulting product exhibits a small particle size, an excellent wettability and a high calcium binding power, and is especially suited as a detergent additive.

10 Claims, No Drawings

PROCESS FOR PREPARING A SUBSTANTIALLY CRYSTALLINE SODIUM ALUMINOSILICATE

BACKGROUND OF THE INVENTION

The present invention relates to the preparation of substantially crystalline sodium aluminosilicates.

For a long period of time it has been common practice to use phosphates as builders in detergent compositions. Yet, lately it has been found that an excess of phosphates in waste waters can lead to an overfertilization of the natural waters. Even though detergent compositions are not the only source of this type of pollution, various efforts have been made to develop detergent compositions wherein the phosphate content is low, yet the overall activity is maintained. Yet, complexing agents, such as trisodium polyphosphates, have an essential importance for the course of the washing process and cannot easily be replaced. Yet, as far as their water softening function is considered, this can also be performed by other watersoftening materials.

Therefore it has been proposed to utilize naturally occuring and/or synthetic sodium aluminosilicates which are insoluble in water for watersoftening purposes. The following properties are required for such sodium aluminosilicates:

1. A small particle size, possibly a particle size of less than about 10$\mu$, preferably of from about 3 to about 6$\mu$, in order to ensure an optimum distribution throughout the washing liquid.
2. A very narrow particle size range, because too small particles are retained in a fabric during a laundering operation, whereas too large particles tend to sediment.
3. Poor adhesive capacity towards textile fibers. This is achieved by using crystalline substances; the adhesive power of amorphous substances is too strong.
4. A high calcium binding power.
5. A good wettability, in order to be able to rapidly develop its full activity.

Sodium aluminosilicates exhibit the advantage, that their calcium binding power which is dependent on the pH-value in the reaction medium, their concentration, and their particle size are not diminished under rising temperatures in the same manner as that of complexing agents. For certain ion exchangers, even an increase of the calcium binding power is observed under rising temperatures due to the increased diffusion rate and the reduction of the degree of hydration.

Amongst the zeolites, those of type A exhibit the highest calcium binding power. Therefore detergent manufactures are especially interested in the latter type of sodium aluminosilicate ion exchangers. These sodium aluminosilicates are usually prepared by reacting a sodium silicate solution with a sodium aluminate solution at elevated temperatures. The crystallization takes place during several hours at temperatures of about 100° C.

According to a process disclosed in the German Auslegeschrift No. 1,038,015 synthetic molecular sieves are prepared by heating solutions containing sodium, silicate, and aluminate ions to a temperature of between 80° and 100° C., rapidly and thoroughly mixing them, and maintaining the mixture at this temperature for at least 5 hours. Yet, the resulting products are not satisfactory for the use as detergent additives. For example, they remain unwetted for a large period after being rinsed or sprinkled into water, and lump or float on the water surface (like sawdust). In view thereof the German Offenlegungsschrift No. 2510675 discloses a method for improving the wettability by thoroughly mixing alkali aluminosilicates with ortho phosphoric acid or alkali ortho phosphates, drying the mixture and subsequently grinding the dried product. Similarly, the use of pentaerythrite as is disclosed in the German Offenlegungsschrift No. 2510676, pentasodium triphosphate as is disclosed in the German Offenlegungsschrift No. 2510741, and tartaric acid as is disclosed in the German Offenlegungsschrift No. 2510742 have been proposed for improving the wettability of alkali aluminosilicates. For the same purpose, the addition of polycarboxylic acids is disclosed in the German Offenlegungsschrift No. 2345432.

The German Offenlegungsschriften Nos. 2333068, 2447021 and 2517218 disclose processes wherein synthesized mixtures are subjected to shearing forces in order to obtain a finely divided product.

From the disclosure of the German Auslegeschrift No. 1667620, it is known, that at an increased alkali concentration in the reaction mixture, the rates of crystallization and particle growth are increased, and that the latter becomes difficult to control unless appropriate precautions are taken. According to the teaching of the German Auslegeschrift, an increase of the alkali content leads to the formation of coarser grains, and chemically uniform precipitates can only be obtained if the silicate solution is introduced into the aluminate solution.

SUMMARY OF THE INVENTION

It is an object of the present invention to provide a process for preparing a synthetic substantially crystalline sodium aluminosilicate, the overwhelming portion of which is of the zeolite A type structure.

It is a further object of the present invention to provide such a process which yields a substantially crystalline product having a low average particle size and a narrow particle size distribution.

It is a further object of the present invention to provide such a process which yields a substantially crystalline product having a high calcium binding power.

It is a further object of the present invention to provide such a process which yields a substantially crystalline product having a good wettability.

It is a further object of the present invention to provide such a process which yields a substantially crystalline product having only little adhesion towards textile fibers.

It is a further object of the present invention to provide such a process which is not adversely affected by small variations of the process conditions which may readily occur during every day industrial production due to various causes.

It is a further object of the present invention to provide such a process which involves only a small number of operations.

It is a further object of the present invention to provide such a process which provides for a fast separation of the precipitated product from the remaining mother liquor.

In order to accomplish the foregoing objects according to the present invention there is provided a process for preparing a synthetic substantially crystalline sodium aluminosilicate which comprises the steps of (a) thoroughly and rapidly mixing an aqueous sodium silicate solution with such an amount of an aqueous sodium aluminate solution that the content of the mixture is equivalent to a molar ratio $x'Na_2O/1Al_2O_3/ySiO_2/z'H_2O$ wherein $x'$ is a value of from about 6.5 to about 9.0, y is a value of from about 1.7 to about 2.2 and $z'$ is a value of from about 180 to about 250 within the minimum period of time which is sufficient for obtaining a uniform mixture by simultaneously introducing said sodium silicate solution and said sodium aluminate solution at a constant ratio into a reaction zone under sufficiently intensive agitation to maintain a constant molar ratio of $Na_2O/Al_2O_3/SiO_2/H_2O$ throughout the reaction mixture whereby a reaction mixture containing an intermediate amorphous sodium alumino-silicate is formed;

(b) maintaining the reaction mixture at a temperature of from about 70° to 100° C. under sufficient agitation in order to continuously ensure the constant molar ratio of $Na_2O/Al_2O_3/SiO_2/H_2O$ throughout the reaction mixture during a period of time which is sufficient to transform the reaction mixture into a suspension of a substantially crystalline sodium aluminosilicate precipitate in a mother liquor, and (c) recovering said substantially crystalline sodium aluminosilicate from the suspension.

According to the present invention there are further provided a synthetic crystalline aluminosilicate, which is obtainable by means of the above-described process, as well as a detergent composition containing at least one surface active agent and said aluminosilicate.

Further objects, features and advantages of the present invention will become apparent from the detailed description of the invention and its preferred embodiments which follow.

DETAILED DESCRIPTION OF THE INVENTION

The process according to the present invention yields a substantially crystalline sodium aluminosilicate having a small particle size and which exhibits a good wettability and a narrow range of particle size distribution. The composition of the resulting sodium aluminosilicate suitably corresponds to a molar ratio of oxides of the empirical formula $xNa_2O/1Al_2O_3/ySiO_2/zH_2O$ wherein x is a value of from about 0.8 to about 1.2, y is a value of from about 1.7 to about 2.2 and z is a value of from about 3.0 to about 10.0. Preferably the particle size distribution of at least 95% of the particles is in the range of from about 1 to about $10\mu$.

According to the present invention, the substantially crystalline sodium aluminosilicate is prepared by rapidly and thoroughly mixing a sodium silicate solution with a sodium aluminate solution by simultaneously introducing both solutions into a reaction zone under thorough mixing whereby a uniform mixture is achieved within a very short period of time. The two solutions are unified under constantly maintaining a constant molar ratio between $Na_2O$, $Al_2O$, $SiO_2$, and $H_2O$. The resulting reaction mixture contains an intermediary amorphous sodium aluminosilicate, which is then allowed to crystallize by maintaining the reaction mixture at a temperature of from about 70° to about 100° C., preferably from about 80° to about 85° C. for a period of time which is sufficient to transform the reaction mixture into a suspension of a substantially crystalline sodium aluminosilicate in a mother liquor. This period of time suitably is from about 1 to about 3, preferably from about 1 to about 2 hours.

In order to obtain the desired properties in the sodium aluminosilicate, it is essential that during the reaction of the components and the crystallization of the intermediary amorphous product, a constant molar ratio between $Na_2O/Al_2O_3/SiO_2$ and $H_2O$ is maintained. This is achieved by simultaneously introducing the two reacting solutions under intensive mixing into the reaction zone and by agitating the reaction mixture during the crystallization period. Hereby, shearing forces are not required; in some cases they even are undesirable. The two reacting solutions should be rapidly brought together. The period of time during which the solutions are introduced into the reaction zone suitably is from about 5 to about 20, preferably from about 5 to about 10% of the following period of crystallization. The fact that the reaction mixture has a relatively high content in $Na_2O$ is a further essential feature of the process according to the present invention which, in addition to the continuously maintained constant molar ratio, is responsible for obtaining the desirable properties of the product. Therefore, it is advisable that the amounts of reactants are chosen such that the reaction mixture contains $Na_2O$, $Al_2O_3$, $SiO_2$ and $H_2O$ in a molar ratio of about 7.0 to about $10Na_2O/1Al_2O_3/$about 1.7 to about 2.2 $SiO_2/$about 180 to about 250 $H_2O$. For the starting solutions, the following molar ratios are recommended:

for the sodium aluminate solution:
a molar ratio of $Na_2O/Al_2O_3$ of from about 5.5 to about 7.0/1
and a molar ratio of $H_2O/Na_2O$ of from about 23 to about 35/1 for the sodium silicate solution:
a molar ratio of $Na_2O/SiO_2$ of from about 0.6 to about 0.9/1
and a molar ratio of $H_2O/SiO_2$ of from about 10 to about 16/1

It is advisable, yet not absolutely necessary, to separately heat both solutions prior to the mixing to a temperature of at least about 60°; e.g., a temperature of between about 60° and about 100° C., preferably of between about 80° and about 95° C. This prior heating can be omitted, if the mixture can readily and quickly be heated to the reaction temperature.

During the intensive mixing of the reacting solutions, an amorphous intermediary sodium aluminosilicate product is formed wherein the grain characteristics of the molecular sieve which later results from the crystallization are already preformed to a large extent. By agitating the reaction mixture in the reactor, the constant molar ratio of oxides is constantly maintained throughout the suspension. Thus it is a characteristic and essential feature of the process that a constancy of the molar ratio between the oxides is maintained from the start of the precipitation until the resulting substantially crystalline product is separated from the mother liquor at the end of the process. Special means for producing shearing forces are not required. The termination of the crystallization is predetermined by the reaction conditions in the process and can be clearly controlled by means of X-ray irridition determining the X-ray diffraction pattern. Usually the crystallization is completed within a period of from about 1 to about 3, preferably from about 1 to about 2 hours. The temperature during the crystallization suitably is between about 70° and about 100° C., preferably between about 80° and about 95° C.

After the crystallization is terminated, the suspension preferably is cooled under continuing agitation so rapidly, that the period of time which is needed for cooling the suspension to about 50° C. does not exceed 30% of the crystallization period. This is recommended merely as a precaution, yet is not necessarily required since a postgrowing of the crystals during the crystallization step occurs only to a minor degree.

Subsequently the resulting substantially crystalline sodium aluminosilicate, which preferably is a sodium aluminosilicate the composition of which corresponds to the molar ratio of oxides of $Na_2O.Al_2O_3.2SiO_2.4.5 H_2O$, is separated from the mother liquor by filtration. The mother liquor can be used for preparing the starting solutions. The raw product is then washed until the washing water exhibits a pH value of from about 10 to about 11. Subsequently, the product is dried under mild drying conditions which are adjusted such, that the resulting product contains a residual water content of from about 18 to about 22%.

The sodium aluminosilicates which are obtained according to the present invention are especially useful as additives in detergent compositions. They may be incorporated into any type of detergent composition containing at least one conventional surface active agent and optionally additional conventional additives, e.g. builders, bleaching agents, foam inhibitors and the like.

The invention will now be further described by the following examples which are intended to be illustrative only.

EXAMPLE 1

4.46 m³ of a sodium aluminate solution the sodium aluminate content of which is equivalent to a molar ratio $Na_2O/Al_2O_3$ of 6.2 and a molar ratio $H_2O/Na_2O$ of 28 and 0.54 m³ of a sodium silicate solution the sodium silicate content of which is equivalent to a ratio $Na_2O/SiO_2$ of 0.83 and a ratio $H_2O/NaO_2$ of 13.4 are each heated separately to a temperature of 90° C.

Both solutions are introduced into a siphon pipe reactor at the above indicated by volume ratio and are mixed under high agitation as intensely as possible within 7 minutes. From the beginning, the suspension of the precipitate which is formed in the reaction is maintained in an agitated state by means of a propeller agitator (diameter 550 mm, inner diameter of the reactor 1700 mm) which is placed close to the bottom of the reactor and is turning at a speed of 240 revolutions per minute. After a crystallization period of 75 minutes at a temperature of 90° C. the mixture is cooled to a temperature of 50° C. within a period of about 20 minutes and is filtered. The filtered precipitate product is washed until the filtrating wash water exhibits a pH value of 10.7. The product is then dried at a temperature of 80° C. in a dryer heated by means of circulating hot air. The properties of the resulting product are as follows:

| composition: | zeolite A, crystal content 86.4% |
|---|---|
| calcium binding power (determined according to the method described in the German Offenlegungsschrift No. 2412837, page 27): | 186 mg Ca O/g waterfree substance |
| grainsize distribution | <15 μ 99% |
| | <10 μ 98% |
| | < 3 μ 50% |
| | < 1 μ 3% |
| wettability* | less than 18 seconds |

*Determination of the wettability :1 g of the dried sodium aluminosilicate is triturated in a mortar and is passed through a sieve having a mesh size of 100 μ onto the surface of 600 ml of water which are contained in a glass beaker. The period of time during which the sodium aluminosilicate is completely wetted with water is determined and is used as a measure of the degree of wettability of the product.

For comparative purposes the wettability of the following prior art molecular sieves are given below:

| product | wetting time |
|---|---|
| Untreated molecular sieve according to DOS 2510675 | >10 minutes |
| zeolite A + $Na_2HPO_4$ according to DOS 2510675 | 120 seconds |
| zeolite A + trisodium polyphosphate according to DOS 2510741 | 110 seconds |
| zeolite A + tartaric acid according to DOS 2510742 | 20 seconds |
| zeolite A + pentaerythrite according to DOS 2516676 | 50 seconds |

EXAMPLE 2

The same amount of the same starting solutions as described in Example 1 are each heated to 90° C. and are mixed at a constant by volume ratio within 6 minutes prior to entering the reactor. The turbulence is reduced as compared to that in example 1 by using a siphon pipe reactor having a diameter which is enlarged one third. After introducing the solutions, the mixture is maintained at a temperature of 90° C. for 90 minutes under agitation with a stirrer turning at 240 revolutions per minute. The mixture is then further treated as is described in Example 1. The resulting product has the following properties:

| composition: | zeolite A, crystal content 90.3% |
|---|---|
| calcium binding power: | 180 mg Ca O/g waterfree substance |
| grainsize distribution: | <15 μ 99% |
| | <10 μ 99% |
| | < 4 μ 50% |
| | < 1 μ 2% |
| wettability | less than 18 seconds |

From the above data it is apparent, that by reducing the mixing intensity the particle size distribution is shifted towards larger particle diameters.

EXAMPLE 3

In this test the amounts and the compositions of the starting solutions as defined in Example 1 are used and the mixing intensity and the precipitation period are corresponding to those in Example 2. In the reactor the mixture is stirred at a speed of 240 revolutions per minute. The crystallization takes place at a temperature of 90° C. within a period of 105 minutes. The mixture is then further treated as is described in Example 1.

| Resulting product: | |
|---|---|
| composition: | zeolite A crystal content 96.4% |
| calcium binding power: | 172 mg Ca O/g waterfree substance |
| grainsize distribution: | <15 μ 99% |
| | <10 μ 97% |
| | <3.2 μ 50% |
| | < 1 μ 1% |

| | |
|---|---|
| -continued | |
| wettability | less than 18 seconds |

What is claimed is:

1. A process for preparing a synthetic substantially crystalline sodium aluminosilicate of the molar composition $xNa_2O \cdot Al_2O_3 \cdot ySiO_2 \cdot zH_2O$, wherein x is a value of from about 0.8 to about 1.2, y is a value from about 1.7 to about 2.2, and z is a value from about 3.0 to about 10.0 which comprises the steps of:

(a) thoroughly and rapidly mixing an aqueous sodium silicate solution and an aqueous sodium aluminate solution in such amounts that the content of the mixtue is equivalent to a molar ratio of $x'Na_2O:1Al_2O_3:ySiO_2:z'H_2O$ wherein x' is a value of from about 6.5 to about 9.0, y is a value of from about 1.7 to about 2.2, and z' is a value of from about 180 to about 250 within the minimum period of time which is sufficient to obtain a uniform mixture by simultaneously introducing said sodium silicate solution and said sodium aluminate solution at a constant ratio into a reaction zone under sufficiently intensive agitation to maintain a constant molar ratio of $Na_2O/AL_2O_3/SiO_2/H_2O$ throughout the reaction mixture whereby a reacton mixture containing an intermediate amorphous sodium aluminosilicate is formed;

(b) maintaining the reaction mixture at a temperature of from about 70° to about 100° C. under sufficient agitation in order to continuously ensure the constant molar ratio $Na_2O/Al_2O_3/SiO_2/H_2O$ throughout the reaction mixture for a period of time of from about 1 to about 3 hours which is sufficient to transform the reaction mixture into a suspension of a substantially crystalline sodium aluminosilicate precipitate in a mother liquor; and (c) separating said substantially crystalline sodium aluminosilicate from the suspension.

2. The process as defined in claim 1 wherein the period of time is from about 1 to about 2 hours.

3. The process as defined in claim 1 wherein the minimum period of time during which the mixing step (a) is carried out is from about 5 to about 20% of the period of time during which the suspension is maintained at a temperature of from about 70° to about 100° C. in step (b).

4. The process as defined in claim 3 wherein the minimum period of time is from about 5 to about 10%.

5. The process as defined in claim 1 which further comprises the steps of heating the sodium silicate solution and the sodium aluminate solution to a temperature of at least 60° C. prior to the mixing.

6. The process as defined in claim 1 wherein the sodium aluminate solution has a sodium aluminate content which is equivalent to a molar ratio $Na_2O/Al_2O_3$ of from about 5.5 to about 7.0 and a molar ratio $H_2O/Na_2O$ of from about 23 to about 35.

7. The process as defined in claim 1 wherein the sodium silicate solution has a sodium silicate content which is equivalent to a molar ratio $Na_2O/SiO_2$ of from about 0.6 to about 0.9 and a molar ratio $H_2O/Na_2O$ of from about 10 to about 16.

8. The process as defined in claim 1 wherein said separating step c further comprises the step of recovering a mother liquor from said suspension and recycling the mother liquor as a solvent for the starting solutions.

9. The process as defined in claim 1, wherein the reaction mixture after termination of the crystallization is cooled under agitation so rapidly that cooling of the mixture to 50° C. does not exceed 30% of the crystallization period.

10. The process as defined in claim 1, wherein the temperature is from about 80° to about 95° C.

* * * * *